United States Patent [19]

Sakamoto

[11] Patent Number: 4,543,613

[45] Date of Patent: Sep. 24, 1985

[54] METHOD FOR PRODUCING HALFTONE DOTS IN A HALFTONE PLATE RECORDING APPARATUS

[75] Inventor: Takashi Sakamoto, Kyoto, Japan

[73] Assignee: Dainippon Screen Seizo Kabushiki Kaisha, Kukyoto, Japan

[21] Appl. No.: 543,911

[22] Filed: Oct. 20, 1983

[30] Foreign Application Priority Data

Oct. 28, 1982 [JP] Japan ................................ 57-188144

[51] Int. Cl.⁴ ........................ H04N 1/22; G01D 15/14
[52] U.S. Cl. .................................... 358/298; 346/108; 346/157; 346/160; 358/75
[58] Field of Search ............... 346/108, 154, 157, 160; 358/75, 298, 300, 302

[56] References Cited

U.S. PATENT DOCUMENTS

4,025,189  5/1977  Pugsley ............................... 358/298

Primary Examiner—Thomas H. Tarcza
Attorney, Agent, or Firm—Lackenbach Siegel Marzullo Presta & Aronson

[57] ABSTRACT

A method for producing halftone dots in a halftone plate recording apparatus is disclosed. A photosensitive material is scanned with a purality of light beams and a plurality of minute dots in lattice-like arrangement are exposed in the range of the halftone dots areas of the halftone plate. Distribution of the quantity of light beams for recording the minute dots is gradually reduced from the center to the periphery thereof, and the intensity of exposure light beams on the minute dots is controlled by the degree of conformity of the minute dots or the pattern of their arrangement with the halftone dot areas.

4 Claims, 17 Drawing Figures

FIG. 1a

$\tan\theta = 0$

FIG. 1b

$\tan\theta = 1/3$

FIG. 1c

$\tan\theta = 1/1$

FIG. 1d $\tan\theta = 3/1$

METHOD FOR PRODUCING HALFTONE DOTS IN A HALFTONE PLATE RECORDING APPARATUS

BACKGROUND OF THE INVENTION

The present invention relates to a method for producing a halftone dot in a halftone plate picture image from an original picture having a continuous tone required for manufacturing printings, and more particularly relates to a dot generator which forms an individual halftone dot by collecting a plurality of minute dots.

Methods of such types described above have been known by the Japanese Patent Publication Nos. 52-33523 and 52-49361, particularly the latter disclosing a method in which a screen angle of a halftone plate is taken rational tangent is adopted to avoid occuring mutual moire-image interference fringe among four color plates of cyan, magenta, yellow and black for multi-color printing and each of the screen angles is different one another.

FIG. 1 shows an example which adopts a screen angle of tan $\theta = \frac{1}{3}$ corresponding to 15°, and other three screen angles are tan $\theta = 0$, tan $\theta = 1/1$, and tan $\theta = 3/1$ which do not generate moire-image interference fringes.

They are screen patterns of which screen angles of FIG. 1a, 1b, 1c, and 1d are corresponding to 0°, 15°, 45° and 75° respectively, and of which lengths of the longitudinal and lateral sides are equal.

In the above method halftone dots may be output on the entire picture image by means of referencing addresses which incliment sequentially in the main scanning direction by a memory device of relative small capacity.

That is, any of directions of longitudinal and lateral side of the memory construction of the square or the rectangular image in which the screen pattern is written agrees with the direction in which the addresses are referenced. Additionally, in general, there occurs no case that the address-referencing is performed passing over or applies data at the same coordinates position twice.

Figure 1A:
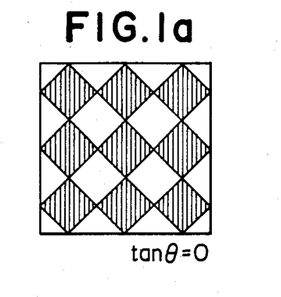
FIG. 1a is a view of a screen pattern of screen angle $\theta$ being 0°.
Figure 1B:
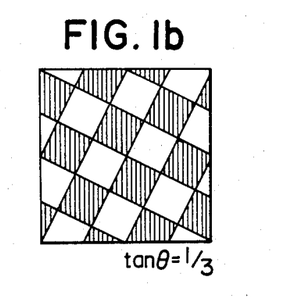
FIG. 1b is a view of a screen pattern of screen angle $\theta$ being 15°.
Figure 1C:
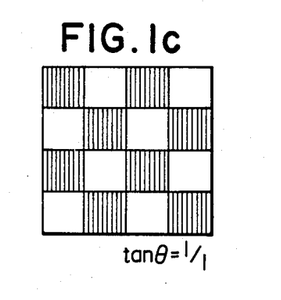
FIG. 1c is a view of a screen pattern of screen angle $\theta$ being 45°.
Figure 1D:
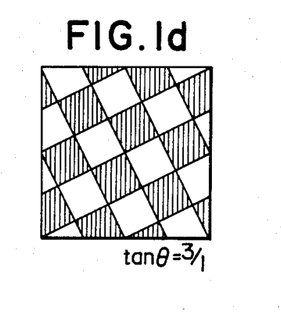
FIG. 1d is a view of a screen pattern of screen angle $\theta$ being 75°.

In this method, to produce a halftone dot having a screen angle of 15° a memory device having a capacity of covering relative wide area including more than several halftone dots therein (examples shown in FIG. 1b and 1d are cases of ten halftone dots) is provided and a diagonal screen pattern is written therein.

As easily understood from FIGS. 1a to 1d, each of those screen pattern written in this memory device may be connected continuously with it opposite sides.

However, in case that a screen patterns for multi-color printing are unable to take screen angles of 0°, 15°, 45° and 75° exactly due to a certain restriction of printing, content of an original picture, etc., a moire-image interference fringe may be produced.

In order to eliminate such moire-image interference fringe, the number of screen line needs varying, e.g., the number of minute dot included in a halftone dot needs varying while using different screen pattern, or the diameter of the minute dot or the distance between minutes dots needs varying while using same screen pattern.

In the former method in which the screen pattern is varied, providing a set of four color screen patterns corresponding to variety of screen number is very troublesome.

Therefore, it is further convenient to apply the latter method in which the diameter of the minute dot or the distance between minute dots may be varied by using a zoom lens or an interchangeable lens in addition to varying the scanning pitch or the scanning clock in using the same screen pattern.

Particularly, alteration of the scanning pitch corresponding to the number of screen line brings disadvantages such as the scanning mechanism becomes complicated, adjustments of the distance between the light beams, the diameter and the intensity thereof, etc. are required. Additionally, another disadvantage is that a relationship between a coordinate system in which character, ruled line, etc. are quantized and a coordinate system in which pictorial pattern is quantized can not be held constant, thus a picture containing both character and the like and pictorial pattern can not be recorded at the same time in scanning. Moreover, it is impossible to record a plural set of halftone picture plates in a same size having different number of scanning lines based on a same picture informations stored in a recording means such as magnetic disc etc.

As one of the data which suggests a method improving the above-described disadvantages, there is a treatise "New Development in Scanner Technology" described on page 251 of the "Progress of Technical Association of the Graphic Arts" published in 1981.

Here, the treatise discloses a method in which a square memory pattern of which a side in length a fundamental period of a halftone dot is referenced in an oblique direction which is not required to agree with a direction of a side of a screen pattern.

With respect to the above-described method a brief description will be given hereinafter.

Figure 2:
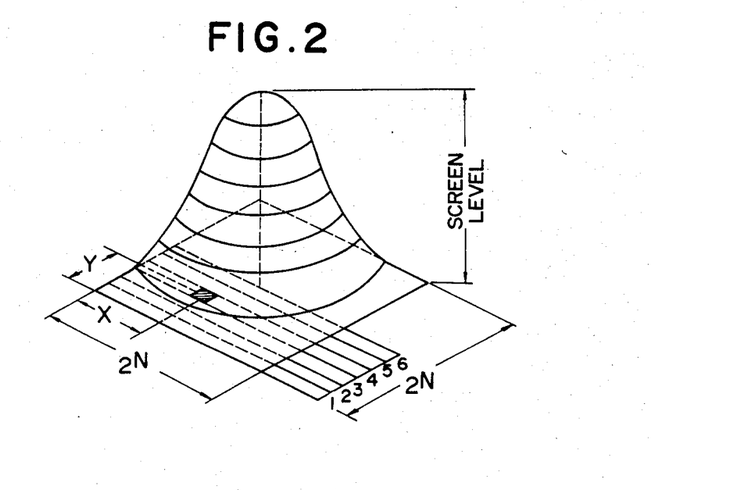
FIG. 2 is a density cubic view of a screen pattern of which one side corresponds to the fundamental period of a halftone screen.

FIG. 2 shows a square screen pattern representing information of a halftone dot, of which one side is a fundamental period of the halftone dot.

Figure 3:
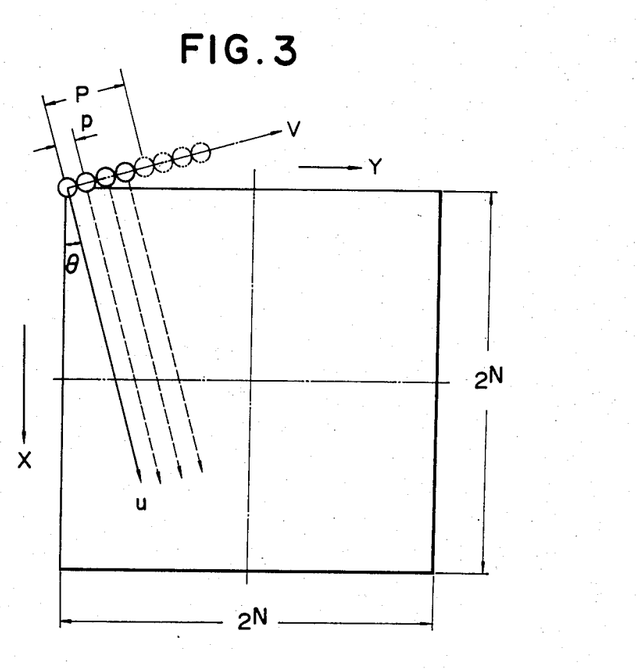
FIG. 3 is a view which shows the relation between addresses having relation with coordinate transformation and minute dots in the case of the screen pattern shown in FIG. 2 being sequentially referenced in the oblique direction with respect to one side thereof.

FIG. 3 is a view illustrating coordinate transformation in case that the square screen pattern memory in which said screen pattern is written is referenced sequentially in a oblique direction.

Directions of X and Y axes are coordinate axes of address of said memory, agreeing with a direction of fundamental period of a halftone dot. u and v denotes a scanning direction and a scanning pitch direction respectively.

As shown in FIG. 3, assuming that an angle between the scanning direction and the X axis of the coordinate system is $\theta$, the following equation of coordinate transformation are established, that is;

$$X = u \cos \theta - v \sin \theta$$
$$Y = u \sin \theta + v \cos \theta \quad (1)$$

here, assuming that the interval between the minute dots forming a halftone dot is p, and putting u=mp, v=np, then, the above equations become as follows;

$$X = mp \cos \theta - np \sin \theta$$
$$Y = mp \sin \theta + np \cos \theta \quad (2)$$

Assuming that the coordinates of the subsidiary scanning are constant during one period of the main scanning operation, the afore-described equations become as follows;

$$X = mp \sin\theta + C_1$$

$$Y = mp \sin\theta + C_2 \qquad (3)$$

where, $$C_1 = -np \sin\theta$$

$$C_2 = -np \cos\theta \, tm \quad (3')$$

The latter equations (3') do not vary during one period of the main scanning operation.

At each of the beginning points of the respective main scanning operation, $C_1$ and $C_2$ are previously calculated to be set as $X=C$ and $Y=C_2$, and from which every time the main scanning operation advances and interval of a space between each of the minute points for forming a halftone dot, if $p \cos\theta$ is added to an addresses of the X coordinate and $p \sin\theta$ to that of the Y coordinate, addresses to which each of screen patterns at respective times can be referenced.

In this case if each of the addresses of X coordinate and that of Y coordinate of the afore-mentioned screen pattern are made to Nth power of 2, in the course of address computation of the above described expression 3 by basing upon binary rotation, even if there occurs overflow to carry in the computation, the screen pattern memory can shift endlessly from the left to the right vice versa by neglecting the carried portion.

In this case if N is 6 and a screen pattern of more than 256 gradations by 64×64 addresses is used, a sufficiently smooth screen pattern can be obtained. However, in the case of accuracy of caluculation being not high, even if it is desired to set screen angle $\theta = 15°$, when $p \cos\theta$ and $p \sin\theta$ are calculated, because of rounded errors caused by digital calculation, the same repetition occurs relatively in short time interval.

Accordingly, in order to avoid the afore-mentioned disadvantage even if one side of the screen pattern memory of square shape is 6 bits ($2^6 = 64$), accuracy of calculation of X and Y coordinates should be extremely high. The accuracy is such as an accuracy of a degree which can sufficiently calculate the number of necessary halftone dots to the size of the largest size that can be output. For example, size of the larger side is 30 inches, the number of screen lines is 175/inch, the number becomes $175 \times 30 \times 64 = 336{,}000 > 2^{18}$. Accordingly, if any number larger than 18 bits and multipliers of 1 byte (8 bits) is convenient, an address may be set to a degree of 24 bits or 32 bits.

Whether a dot should be exposed or not can be determined by comparing a screen level obtained by referencing the screen pattern memory basing on X and Y addresses obtained as afore-described with a picture image level. Collection of plurality of thus exposed minute dots form an individual halftone dot.

In the above described method a halftone picture of any described screen angle can be output using the same screen pattern only by changing the screen angle $\theta$, and further, by varying value of p, a halftone dot of any given screen line number can be output. That is, as p is put smaller, times of adding operation necessary for X and Y addresses to attain to the fundamental period of the screen pattern are increased, so that even if the main scanning clock and the scanning pitch are fixed, a large halftone dot can be output.

Basing upon the above described technique, a feeding mechanism, a main scanning clock generating circuit etc. can be simplified. Further, even if there are any variations in feeding pitch, adjustment and/or modification regarding distance between beams, size of the beams, intensity of the beams etc. which have been necessary in those conventional methods are unnecessary.

However, in this method there is also a serious disadvantage as follows; that is, in this method a screen level D of which coordinates are obtained by using the pitch p which corresponds to a desired screen angle $\theta$ and the desired screen line number is compared with the picture image level, and according to the result whether exposure should be performed or not is determined. Accordingly, even in the case of an identical contour line configuration being referenced by basing upon the degree of conformity of a contour line configuration corresponding to the picture image level E on the screen pattern to the reference coordinates, there occurs dispersion in the number of exposed minute dots.

Figure 4A:
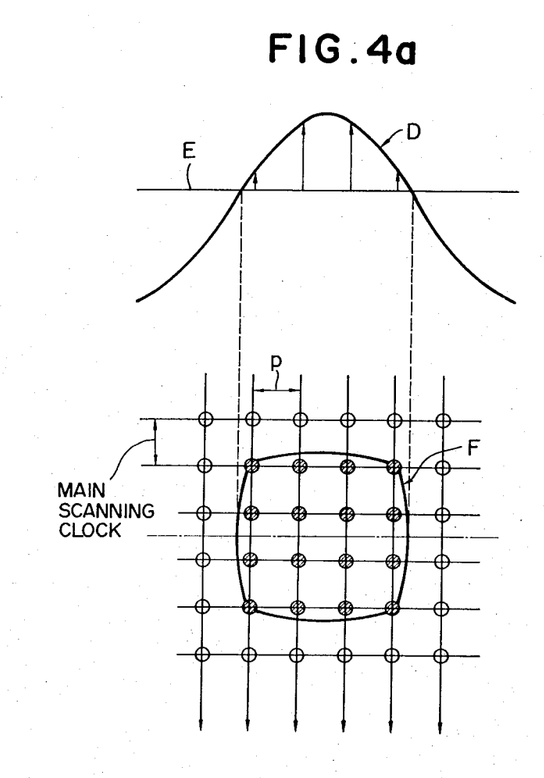
FIG. 4a is a view of a case in which the degree of conformity is good.
Figure 4B:
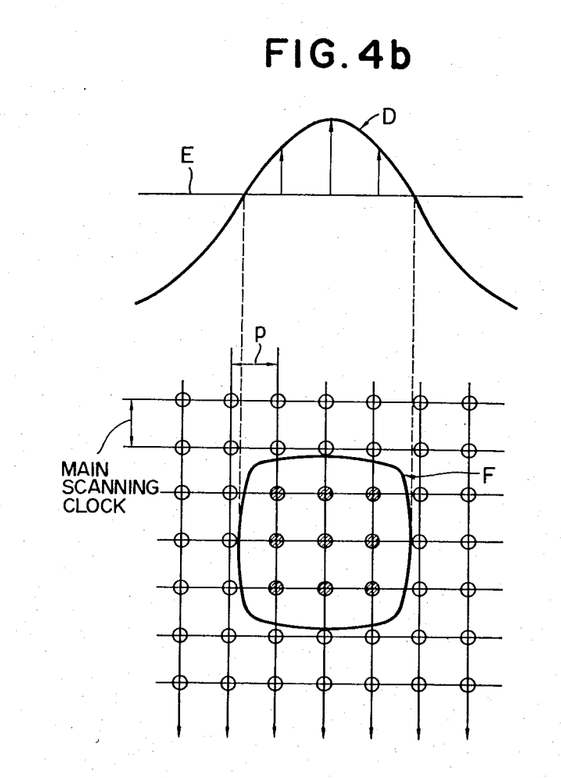
FIG. 4b is a view of a case in which the degree of conformity is not good.

FIGS. 4a and 4b show one of the examples of the above described cases. FIG. 4a shows a case in which the degree of conformity is good, and FIG. 4b shows another case in which the degree of conformity is not good. Here in FIGS. 4a and 4b, there are shown cases in which exposing operation is carried out when the screen level D is higher than the picture image level E which corresponds to light and darkness of the pictorial pattern to be reproduced.

As described the above, even if it is identical with the picture image level, depending upon the degree of conformity of the coordinates which refer to the screen pattern, there comes out considerable difference in the number of the minute dots to be exposed. Such dispersion in the number of these exposed minute dots results in occurrence of fatal blurs in the halftone plate for printing.

Of course, a method in which merely the intensity of an exposure light beam is varied stepwisely is disclosed in the specification of the U.S. Pat. No. 4,025,189. The object of the invention disclosed in the patent is not to pursue subtle control of an area of a halftone dot, but lies in consequently forming a halftone dot (soft dot) of which quantity of silver at the peripheral edge portion is less than that of the central portion thereof.

In the plate-making process, when it is desired to make a part or the whole of halftone dots of a film once having been exposed and developed smaller, the dot etching is performed. It is very convenient that in this case even if the halftone dot is made smaller by performing etching, in a soft dot there remains considerable quantity of silver in the central portion.

The method disclosed in the afore-mentioned U.S. Pat. No. 4,025,189 is that when the intensity of an exposure light beam is calculated, if a pair of values aligned in the scanning pitch direction of a screen pattern memory are accessed simultaneously, and differences obtained by comparing each of the values with the level of the same picture image are put as a and b respectively, the results are as follows; that is, if both a and b are positive values, the intensity is 100% of the intensity of the light beam, if both are negative, the intensity is 0% of that of the light beam, and in the case of a and b being different signs, the intensity of the exposure light beam is calculated basing upon the following equation, $(a+b)/(a-b)=$ intensity of exposure light beam.

However, this method is on the premise that in case of multiprintings, the memory referencing method disclosed in the afore-described Japanese Patent Publication No. 52-49361 is applied. Accordingly, there is no description in the publication with respect to excellency in the degree of conformity of the coordinates to which the screen pattern in question is referenced, and dispersion in the number of minute points.

In addition, there is another disadvantage that calculation for determining the intensity of the exposure light beam is quite complicate.

SUMMARY OF THE INVENTION

It is an object of the present invention to improve disadvantages of those conventional methods in which dispersion in the number of minute dots basing upon the degree of conformity, as described the above, results from shape and configuration of each of halftone dots and dimension of an area thereof so as to control the intensity of exposure light beam to be emitted thereto, and to reduce the dispersion in the dimension of the halftone dot area basing upon the degree of conformity by varying the intensity of the exposure light beam stepwisely.

That is, the object of the present invention is to make it possible to subtly control an area of a halftone dot by varying the intensity of an exposure light beam stepwisely, and solve problems caused by the degree of conformity.

BRIEF DESCRIPTION OF DRAWINGS

FIG. 1a to 1d show screen patterns in a conventional dot generator, in which

FIGS. 4a and 4b are views which show the degree of conformity of the referencing coordinates to a contour line configuration which corresponds to the level of a picture image on the screen pattern;

From FIG. 5a to FIG. 5d are view illustrating the states of subtle changes of a halftone dot area ratio in the case of the intensity of the exposure light beam being varied stepwisely;

FIG. 6a and FIG. 6b show a wave shape representing the degree of conformity of a screen pattern and a picture image level;

DESCRIPTION OF THE PREFERRED EMBODIMENTS

Figure 5A:
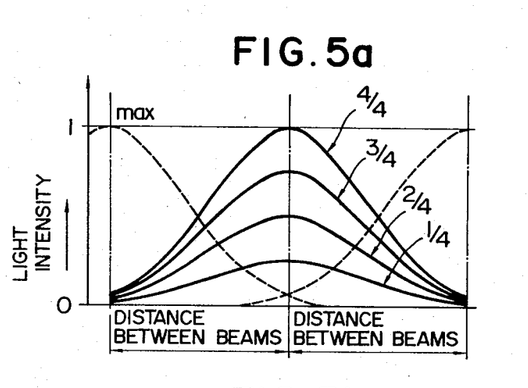
FIG. 5a is a sectional view of the central portion of a halftone dot which shows distribution of the intensity of the minute dots in the case of the maximum intensity of the exposure light beam set to 1 and each of the intensity of the exposure lights being defined to ¼, 2/4, ¾ and 4/4, respectively.

FIG. 5a to 5d show examples illustrating subtle changes of the halftone dot area in the case of 12 minute dots in which the intensity of the exposure light beam is varied stepwisely. FIG. 5a show an example of distribution of the intensities of the exposure light at the minute dots in the case of the maximum intensity of the exposure light being set as 1, and cases in which the intensities of the exposure lights are set to 0, ¼, 2/4, ¾ and 4/4.

The distribution of the intensity of the minute dots shown in FIG. 5a presents Gaussian distribution, so that at the maximum, and a position at which the intensity of light is a half of that of the central portion is determined to be a half of the distance to the adjacent minute point.

Figure 5B:
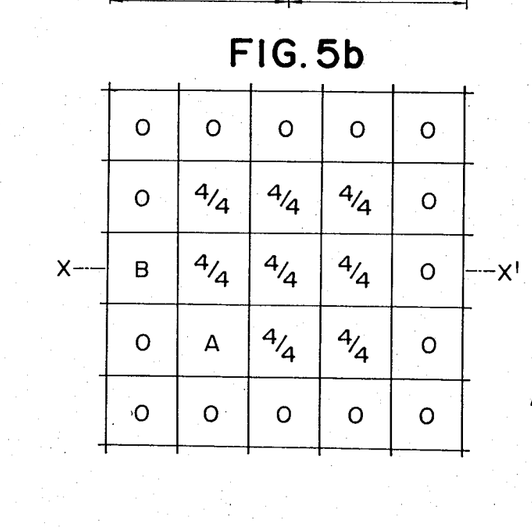
FIG. 5b is a view of arrangement of a plurality of minute dots of a model of a halftone dot in the case of 15 minute dots which are exposed by the maximum intensity 1 of exposure light and two minute dots in the vicinity of them to which the intensity of exposure light is varied at four steps.
Figure 5C:
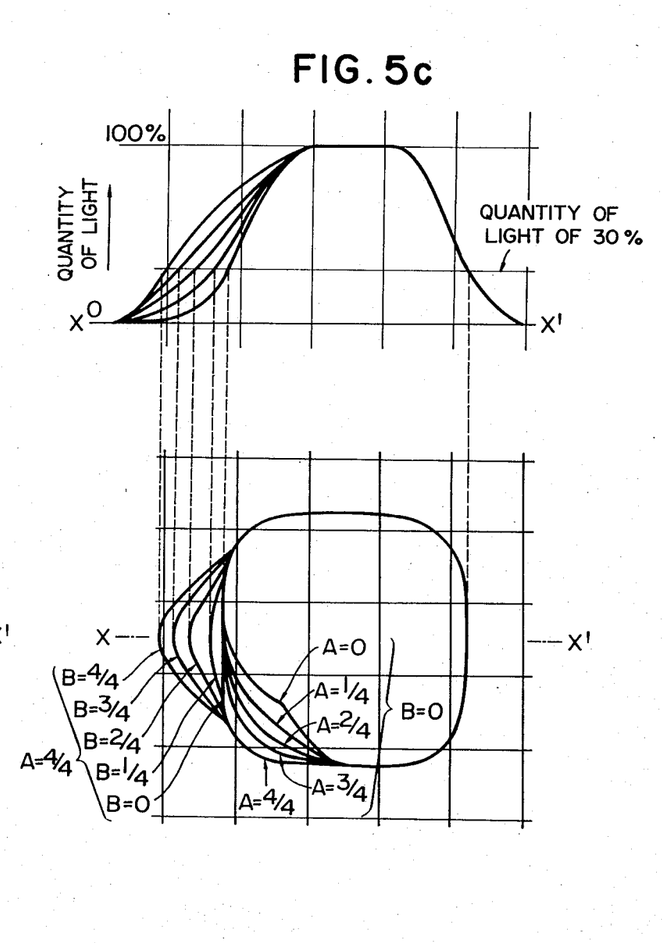
FIG. 5c is a view of a halftone dot showing contour lines corresponding to the halftone dot area ratio in the case of the intensity of the exposure light at two minute dots A and B in the halftone dot model shown in FIG. 5b being varied.

A contour line configuration of the quantity of light being 30%, when the intensities of light beam at both A and B dots of the halftone dot model shown in FIG. 5b are varied by using such beams as the afore-mentioned (when over the considerably wide range the quantity of light at all the peripheral portions is 4/4, the quantity of light at the central portion of the halftone dot is determined to be 100%), and a sectional view of distribution of the quantity of light at X—X' position is shown in FIG. 5c. From FIG. 5c it will be understood that according to variation of the intensity of light, the contour line is gradually swollen.

In addition, it can also be understood that the slope of a slanting surface which traverses the contour line of the quantity of light of 30% is more gentle in the case of the intensity of light at B dots being defined to be 1/4, 2/4, and 3/4 in comparison with the case in which the intensity of light of the same dot is defined to be 0/4 by reviewing the sectional view at the X—X' position of distribution of the quantity of light. This means that the halftone dot becomes soft.

Figure 5D:
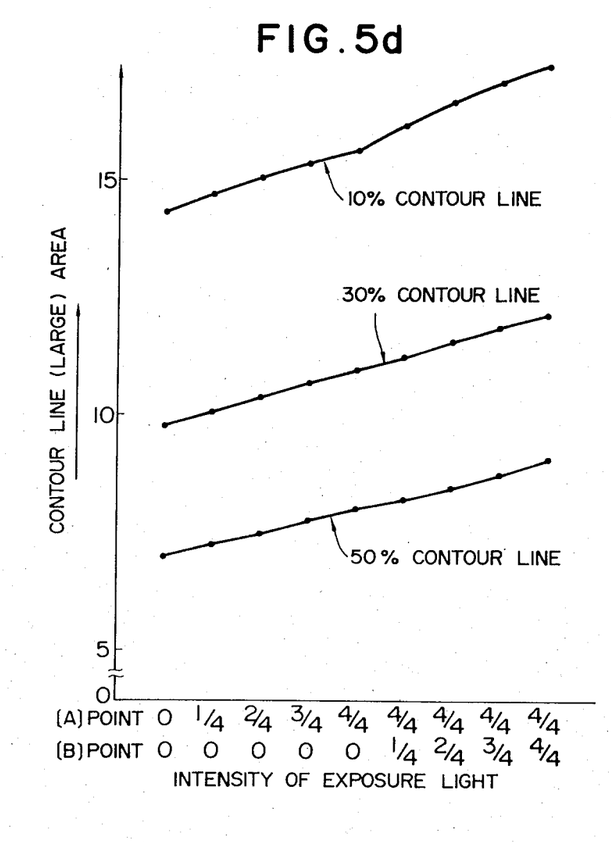
FIG. 5d is a characteristic graphs of a combination of area changes of the contour line configuration at the quantity of light being 10%, 30% and 50% shown in FIG. 5c and the intensities of exposure light at A and B dots.

Further, change of area of the contour line configuration of the quantity of light of 10%, 30% and 50% in the case of the intensity of the exposure light at A and B dots is shown in FIG. 5d.

At each of the cases the area generally becomes larger in accordance with increase of the intensity of light. Especially, in the case of the contour line configuration of 30%, the area increases approximately linearly.

In the case of any advantage being obtained by the degree of conformity (i.e., the halftone dot becomes larger) by utilizing the above-described result, even if the total number of the minute dots to be exposed are large, when the intensity of the exposure light at the periphery is attenuated, and the case of losing advantage by the degree of conformity (the halftone dot becomes smaller), it is possible to reduce variation of shapes of the halftone dots and dispersion of areas of the halftone dots by making the intensity of light beam at the peripheral edge portions approximately equal degree to that of the central portion.

In the following two methods for strengthening the intensity of exposure light beam at the peripheral edge portions of a halftone dot in comparison with that of the central portion thereof will be described, for example.

It goes without saying that these methods are applicable both in a single beam system and/or a multi-beam system in which each of a plurality of beams is independently controlled.

The first method of the afore-mentioned is a method for varying the intensity of exposure light beam in which calculation is carried but by using the screen level D and the picture image level E, and according to the magnitude of the result of the calculation, the intensity of the exposure light beam is to be varied. In this method the following technique is utilized that even if a screen pattern written in a memory is to be set as the largest (or the smallest) in the center point of the halftone dot, it is usual to take a small (or large) value as being away from the point.

Figure 6A:
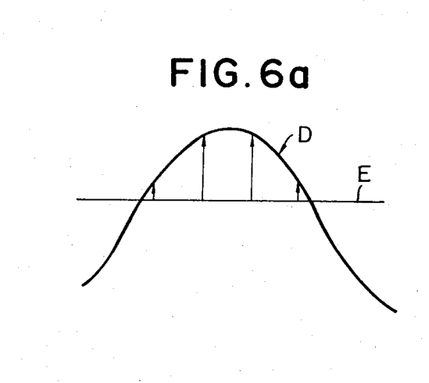
FIG. 6a shows a case of the degree of conformity being good.
Figure 6B:
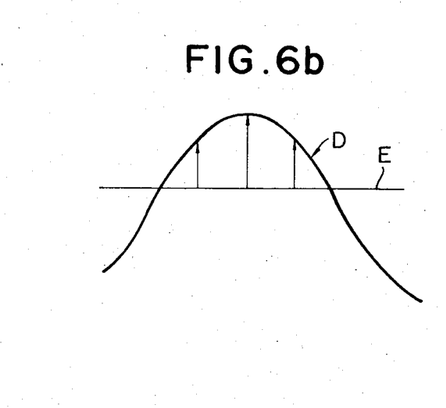
FIG. 6b shows a case of the degree of conformity being not good.

In this method when the contour line configuration F on the screen pattern corresponding to the picture image just conforms within the limits, as shown in FIG. 6a, difference between the screen level D and the picture image level E at the both ends, and in the case shown in FIG. 6b difference between the screen level D and the picture image level E at the ends is considerably large. Considering the above, basing on largeness of difference between the screen level D and the picture image level E, the intensity of the exposure light is controlled. Of course, when value of difference becomes negative, irrespective of largeness of absolute value thereof, the intensity of the exposure light is defined to zero (no exposure is emitted).

It is one of the methods to proportionate the largeness of the difference between them at this time to the intensity of the exposure light; however, it is possible to select width for making the exposure light soft not necessarily by depending on proportional relation, but by varying stepwisely, by setting a constant maximum or minimum, or by proportionating to value of squared difference or that of squared root.

Figure 7:
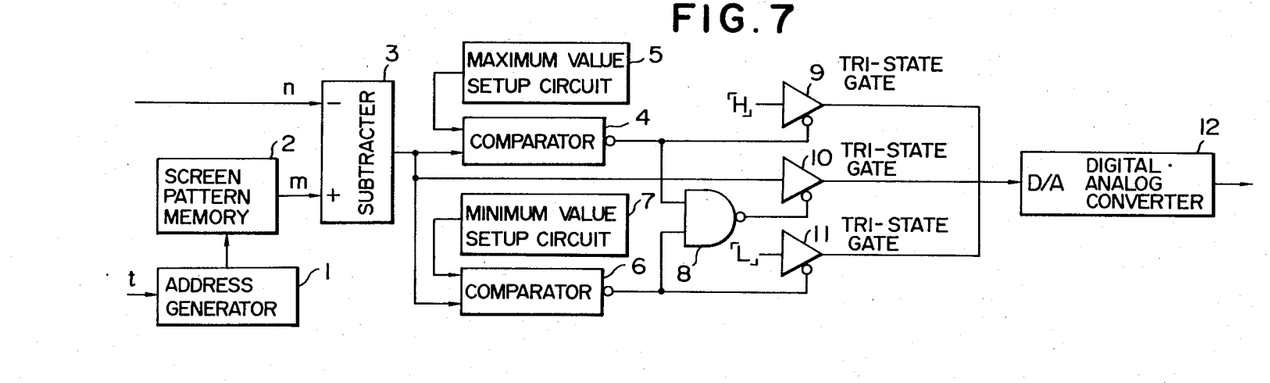
FIG. 7 is a block diagram showing an embodiment of an electric circuit for practising the method according to the present invention.

FIG. 7 there is shown a block diagram of the method illustrating one embodiment in which the constant maximum and the minimum limits are provided.

In FIG. 7 the reference number 1 is an address generator, 2 is a screen pattern memory into which, for example, the screen level as shown in FIG. 2 is written at a predetermined address, 3 is a subtractor, 4 and 6 are comparators, 5 is a maximum value setup circuit consisting of a digital switch etc., 7 is a minimum value setup circuit and 8 is a NAND gate. 9, 10 and 11 are tri-state gates and 12 is a digital/analog converter.

In FIG. 7 an analog/digital converted picture image signal n by an appropriate sampling pitch is input to a negative terminal of the subtractor 3 as a reference value, while basing upon clock pulse t, an address designating signal to a table memory (screen pattern memory) 2 is output from the address generator 1, and from the predetermined address of the table memory 2 a numeric value m corresponding to the afore-mentioned screen level D is input to a positive terminal.

Value m−n operated by the subtracter 3 is input to the comparators 4 and 6, respectively, and in the comparator 4 the value m−n is compared with the maximum setup value $V_{max}$, and in the other comparator 6 the value is compared with a minimum setup value $V_{min}$ having been set up in the minimum value setup circuit 7, respectively.

For example, when the value m−n operated by the subtractor 3 is equal to the maximum setup value $V_{max}$, or in the case of the value is larger than the maximum setup value $V_{max}$, the gate 9 is opened by an output from the comparator 4, and a high level signal H is output through the gate 9. By an output signal from the comparator 6 the gate 11 is opened, and a lower level signal L corresponding to the intensity of light beam of zero is output. Further, when the value m−n is smaller than the maximum setup value $V_{max}$ and larger than the minimum setup value $V_{min}$, the gate 10 is opened by an output signal from the NAND gate 8, then the value m−n is output through the gate 10, and the light beam is modulated so that the intensity of the light beam corresponds to the value m−n.

In addition, practically the same number of light beam modulation control circuits as that of light beams to be recorded, as one of them being shown in FIG. 7, are arranged in parallel.

The gist of the second method is that addressing and referencing are carried out in a density of integral multiples of the density corresponding to the distance between the minute dots, a result obtained by comparing the screen level D in an area of which one side corresponds to the distance between the minute dots and the picture image level E (if it is exposed, the result is 1, and not exposed, then the result is 0) are added, and in proportion to the added result the intensity of the exposure light beam is output.

Figure 8:
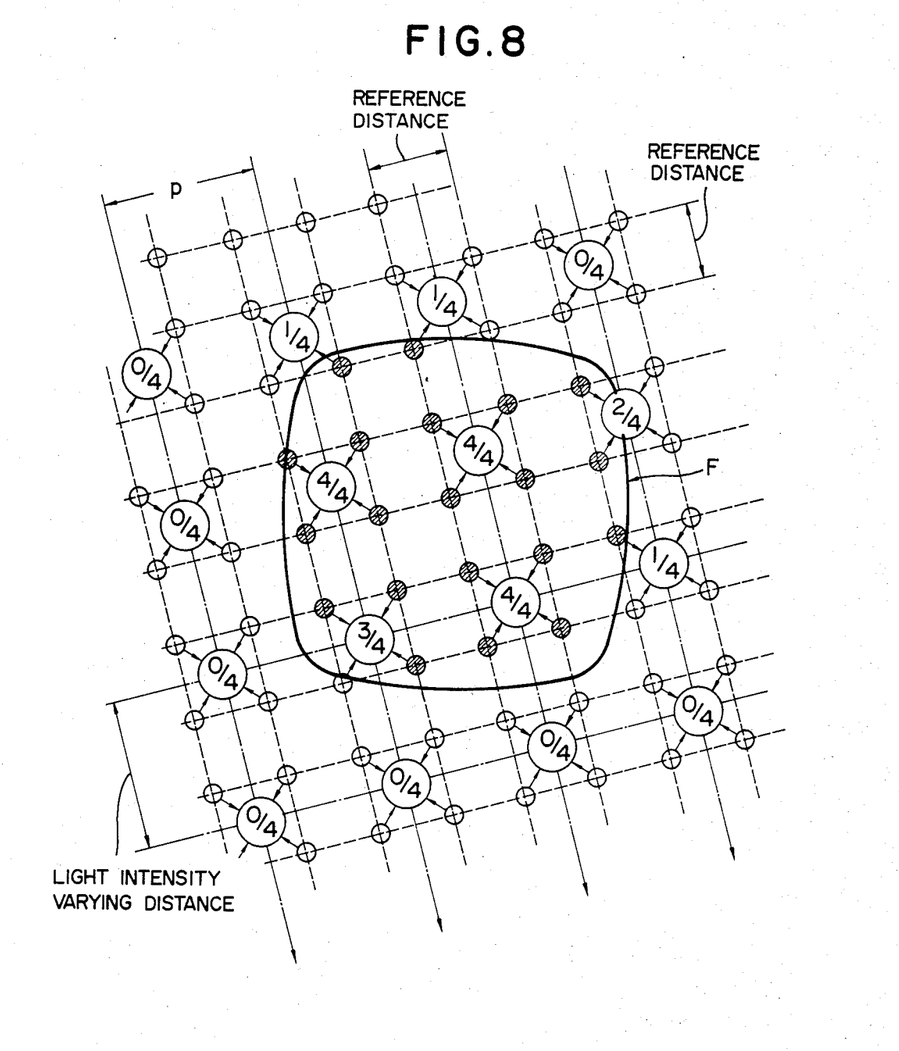
FIG. 8 is a view showing the relation between the arrangement of each of the minute dots and that of each of the referencing points for practising the method of the present invention by other means other than the emobdiment shown in FIG. 7.

In FIG. 8 one example in which a reference distance is set to 1/2 of the distance between two minute dots (density is two times, area is four times) is shown. Each of the minute dots is exposed with the intensity of the exposure light which is proportional to a sum of the compared results at four dots in the periphery thereof. 0/4 shows a case in which a result of no exposure at the four dots in the perphery is obtained, 1/4 shows a case in which a result of only one dot being exposed in the periphery is obtained, 2/4 shows a case in which a result of two dots being exposed in the periphery is obtained, 3/4 shows a case in which a result that three dots are exposed in the periphery is obtained, and 4/4 shows a case in which a result that all four dots are exposed is obtained.

According to the method, a disadvantage that addressing and comperison for referencing must be carried out in a closer density to the twice thereof, however, there are excellent advantages as follows;

(1) logic is simple, and this method can improve processing speed and count up to four;

(2) the periphery of each of the halftone dots becomes soft;

(3) the shape of the contour line configuration can be reflected in good condition; and (4) to some extent both levels of the maximum and the minimum points are stabilized.

In the first method when difference between the levels is small, there are some cases in which light beam is exposed by an intermediate intensity, even at portions other than the outermost edge portion.

Figure 9:
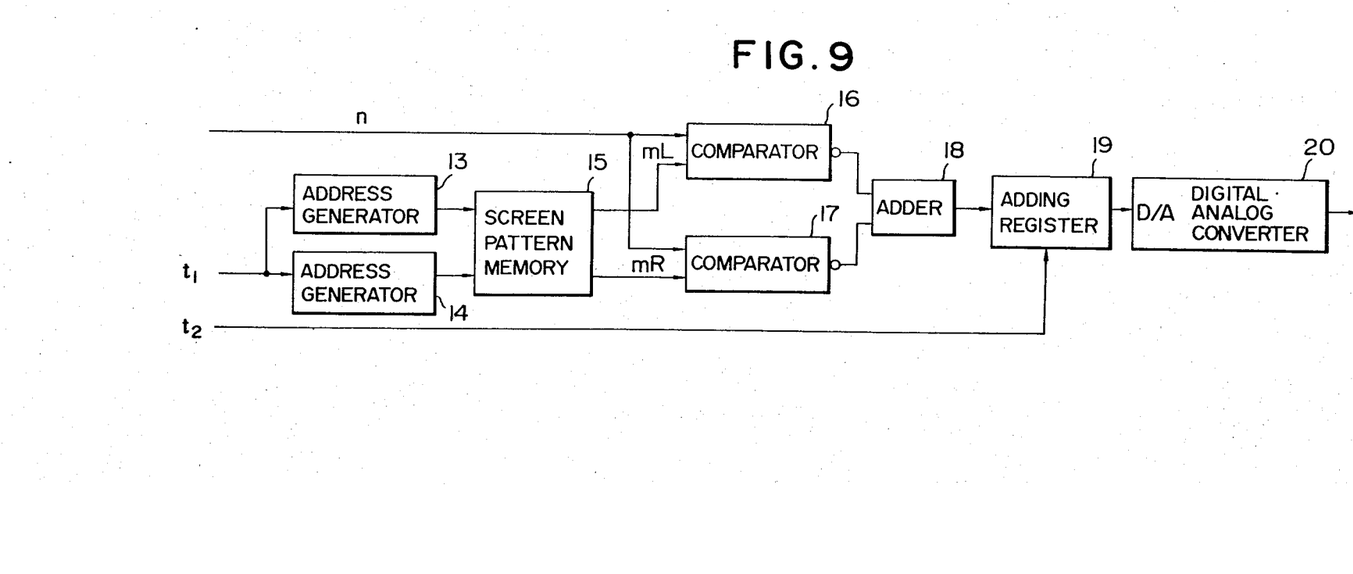
FIG. 9 is a block diagram showing an example of an electric circuit for practising the method according to the present invention by basing upon the referencing point shown in FIG. 8.

There is shown a block diagram illustrating an example for practicing the present method in FIG. 9. The reference numbers 13 and 14 are address generators of the left and the right sides, respectively. 15 is a screen pattern meory, 16 and 17 are comparators, respectively. 18 is an adder, 19 is an adding register 20 is a digital-/analog converter.

In FIG. 9 an picture image signal n converted from analog to digital with a suitable sampling pitch is input into the comparators 16 and 17 as the reference value. While, basing on the reference clock pulse $t_1$ (this clock pulse is in synchronism with a modulation clock puse $t_2$ frequency of twice thereof which will be described hereinafter), from the address generator 13 and 14, a pair of right and left address designation signals to the screen pattern memory 15 are output.

The screen pattern memory 15 inputs each of screen level signals $m_L$ and $m_R$ which corresponds to the respective left and right addressing signals to the comparators 16 and 17, respectively. In the comparator 16 n is compared with $m_L$, and in the comparator 17 n is compared with $m_R$, and respectively inputs 1 to an adder 18 when the result requires to be exposed, and inputs 0 in the case of no exposure being required.

The adder 18 adds both compared results, and inputs the added result to an adding register 19. The adding register 19 counts the compared results twice per each of twice the reference clock, that is, after all it counts the compared results four times, and any of the values from 0 to 4 is transferred to the digital/analog converter 20 in synchronism with the modulation clock $t_2$, and after then it is cleared.

As described heretofore, according to the present invention, a fixed scanning pitch system can be adopted for varying the screen line number, and simplification of the feeding mechanism can be realized. In addition, there is another advantage that even if there is any variation in the feeding pitch, adjustment of the distance between the beams, size of the beams and the intensity of the light beam which have been conventionally required is unnecessary.

Further, when the present invention is applied to an output device of a layout scanner, relationship between coordinate system in the case of the character, ruled lines etc. being quantized (usually finer than the screen pitch and wider than the distance between the minute points), and coordinate system regarding the pictorial pattern (scanning pitch) becomes constant, so that simultaneous existence of the pictorial pattern, the characters, the ruled lines etc. and simultaneous output thereof can be facilitated.

Further, basing upon the identical picture image information stored in a magnetic disc etc., several sets of same sized halftone plate picture images each of which the screen line number is different can be output.

It is further advantage of the present invention that dispersion in shape of each of halftone dots and dispersion of the number of the minute dots which are resulted from goodness of the degree of conformity, can be diminished to prevent printings from being blurred, and for the reason that the dots become soft, dot-etching can be also carried out. Thus, many excellent effects can be obtained.

Although the present invention has been described and shown with reference to the preferred embodiments illustrated in the acoompanying drawings, various changes and modifications can be made thereto by those skilled in the art without departing from the scope of the present invention.

What is claimed is:

1. A method for producing halftone dots in a halftone plate recording apparatus in which a photosensitive material is scanned by using a plurality of exposure light beams, and a plurality of minute points are exposed in lattice-like arrangement within halftone dot areas of a halftone plate to be recorded characterized by comprising the following steps:

gradually reducing distribution of the quantity of exposure light beams which are used for recording said minute dots from the center to the periphery thereof; and controlling the intensity of exposure light beams on said plurality of minute dots depending on the degree of conformity of said minute dots or the pattern of their arrangement with said halftone dot areas.

2. A method as defined in claim 1, wherein each of a plurality of reference points is disposed at the periphery of each of said minute dots arranged in a lattice-like pattern, the degree of conformity of said lattice-like arranged pattern of the minute dots to a halftone dot area is detected by basing upon whether these reference points are included or not in said halftone dot area, and according to the degree of conformity, the intensity of exposure light on said minute dots are controlled.

3. A method as defined in claim 2, wherein a set of four reference points are disposed at a corner of a square, the center of the corner being a minute point; and in accordance with the number of the reference points in the set being included in the halftone dot area, the intensity of exposure light beams is controlled to 1, ¾, ½, ¼ or 0.

4. A method as defined in claim 1, wherein a level of the halftone dot area at which a level of the halftone dot information exceeds a level of the picture image is detected, and the intensity of exposure light of the cooresponding minute dots is controlled depending upon the magnitude of the level of the halftone dot area to the minute dots at the peripheral portions of the halftone dot area.

* * * * *